(12) United States Patent
Childers

(10) Patent No.: US 7,605,828 B2
(45) Date of Patent: Oct. 20, 2009

(54) METHOD AND SYSTEM FOR REDUCING GRAY SCALE DISCONTINUITIES IN CONTRAST ENHANCING SCREENS AFFECTED BY AMBIENT LIGHT

(75) Inventor: Winthrop D. Childers, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1077 days.

(21) Appl. No.: 10/782,706

(22) Filed: Feb. 18, 2004

(65) Prior Publication Data

US 2005/0179706 A1    Aug. 18, 2005

(51) Int. Cl.
*G09G 3/36* (2006.01)
*G09G 5/10* (2006.01)

(52) U.S. Cl. ........................................ 345/690; 345/89

(58) Field of Classification Search ........... 345/55–104, 345/204–214, 690–697
See application file for complete search history.

(56) References Cited

U.S. PATENT DOCUMENTS

| | | | |
|---|---|---|---|
| 5,828,356 A | 10/1998 | Stoller | |
| 6,429,833 B1 | 8/2002 | Ryeom et al. | |
| 6,535,648 B1 | 3/2003 | Acharya | |
| 6,577,291 B2 | 6/2003 | Hill et al. | |
| 6,587,576 B1 | 7/2003 | Wesolkowski | |
| 6,714,206 B1* | 3/2004 | Martin et al. | 345/690 |
| 6,850,215 B2* | 2/2005 | Lee et al. | 345/89 |
| 6,853,486 B2* | 2/2005 | Cruz-Uribe et al. | 345/84 |
| 7,259,769 B2* | 8/2007 | Diefenbaugh et al. | 345/600 |
| 2002/0114012 A1* | 8/2002 | Fujita | 358/3.06 |
| 2005/0083293 A1* | 4/2005 | Dixon | 345/102 |

* cited by examiner

Primary Examiner—David L Lewis

(57) ABSTRACT

A method and system for reducing a gray scale discontinuity between pixel locations in a blackened state on a contrast enhancing screen and pixel locations in a gradual shading region of an image displayed by a projector on the contrast enhancing screen. The discontinuity is caused by ambient light. The method comprises measuring an intensity of the ambient light, comparing the measured ambient light intensity to an intensity of light projected by the projector onto the gradual shading region, and generating apparent gray scale levels for the pixels to be displayed in the pixel locations in the gradual shading region based on the comparison.

46 Claims, 10 Drawing Sheets

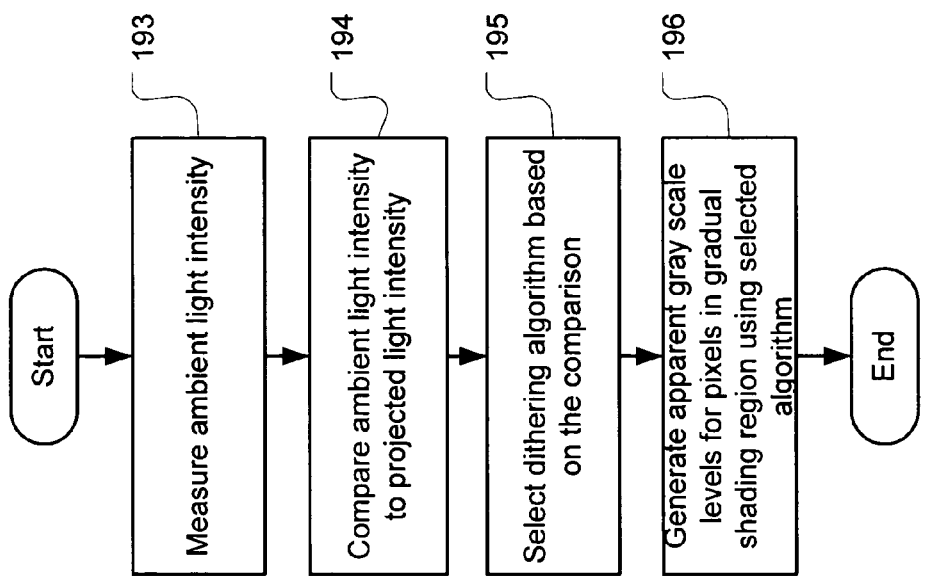

| Projected light intensity | Ambient Light Intensity | Dithering Algorithm |
|---|---|---|
| 0 | 0 | A |
| 0 | 1 | B |
| 0 | 2 | C |
| 0 | 3 | D |
| 1 | 0 | E |
| 1 | 1 | F |
| 1 | 2 | G |
| 1 | 3 | H |
| 2 | 0 | I |
| 2 | 1 | J |
| 2 | 2 | K |
| 2 | 3 | L |
| 3 | 0 | M |
| 3 | 1 | N |
| 3 | 2 | O |
| 3 | 3 | P |

Fig. 10

METHOD AND SYSTEM FOR REDUCING GRAY SCALE DISCONTINUITIES IN CONTRAST ENHANCING SCREENS AFFECTED BY AMBIENT LIGHT

BACKGROUND

Digital projection systems or devices are frequently used to display a still or video image. Viewers evaluate digital projection systems based on many criteria such as image size, color purity, brightness, resolution, and contrast ratio. Contrast ratio, or the difference in brightness between the lightest and darkest tones in the displayed image, is a particularly important metric in many display markets.

One popular class of digital projection systems is a front projection system. A front projection system projects an image onto a reflective screen which displays the image. Front projection systems are advantageous in many different settings because of their size, cost, and ease of use.

However, front projection systems are generally only suited for relatively dark rooms because front projection screens indiscriminately reflect all light incident to its surface with equal efficiency. Light from the projector can be diluted by light from room lights, windows, pixel to pixel interference, and/or any other ambient light. Thus, ambient light limits the effective contrast ratio of many front projector systems to undesirably low levels.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

FIG. 9 is a flow chart illustrating a method of eliminating or reducing the visual effects of the sharp discontinuity at the edge of the black region and the gradual shading region caused by ambient light according to one exemplary embodiment.

FIG. 10 illustrates an exemplary look-up table that may be used by the image processing unit to select an appropriate dithering algorithm according to one exemplary embodiment.

Throughout the drawings, identical reference numbers designate similar, but not necessarily identical, elements.

DETAILED DESCRIPTION

Figure 1:
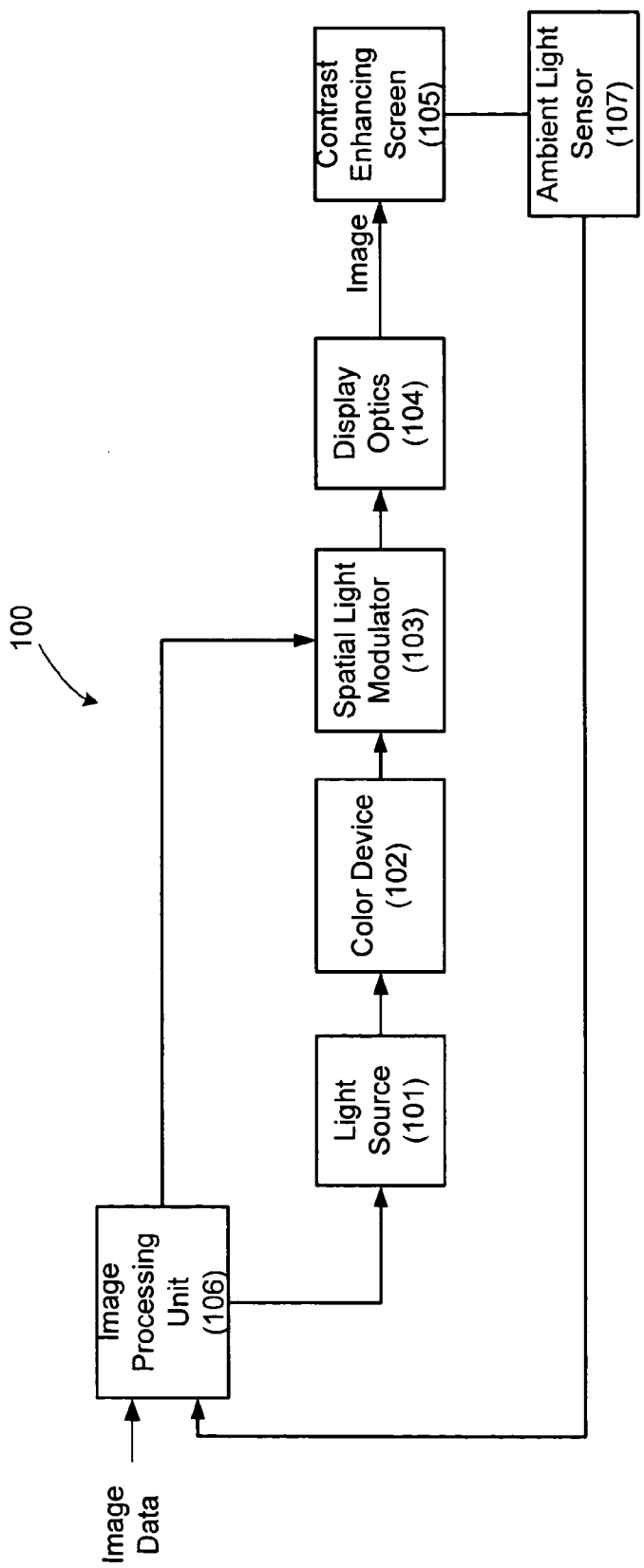
FIG. 1 illustrates an exemplary light engine according to one exemplary embodiment.

A method and system for enhancing the contrast of an image that is projected by a light engine onto a viewing surface while avoiding visual artifacts caused by ambient light are described herein. The light engine is configured to generate and display pixels upon the viewing surface at various screen pixel locations.

The viewing surface may be a contrast enhancing screen that includes an array of screen pixel elements. Each screen pixel element may correspond to a screen pixel location on the surface of the contrast enhancing screen. Each screen pixel element is configured to enhance the contrast of an image that is displayed on the screen by being in a black or non-reflective state when the screen pixel element's corresponding screen pixel location is not receiving light from the light engine. Each screen pixel element is also configured to be in a white or reflective state when the corresponding screen pixel location is receiving light from the light engine. Thus, a screen pixel location corresponding to a screen pixel element in a non-reflective state does not reflect light, including ambient light, that is directed onto the screen pixel location. Conversely, a screen pixel location corresponding to a screen pixel element in a reflective state reflects all light, including ambient light, that is directed onto the screen pixel location.

In one exemplary embodiment, the system may include an ambient light sensor configured to generate information indicative of the intensity of ambient light present in the vicinity of the light engine and/or the viewing surface. This information may include the intensities of individual components of light such as red, green, and/or blue or it may include some composite luminance value. In one exemplary embodiment, the ambient light sensor allows for automatic adjustment of a turn-on threshold for the screen pixel elements so that the screen pixel elements respond only to projected light with an intensity greater than the intensity of the ambient light.

In one exemplary embodiment, the light engine generates and displays pixels having a gray scale level during a frame period. To generate a gray scale level for a particular pixel, the light engine may deliver a certain dosage or energy of light to the pixel's corresponding pixel location during the frame period. For a given group of pixels, the light engine can generate a spectrum of gray scale levels from a minimum dosage to a maximum dosage.

As will be explained below, undesirable visual artifacts may be created when an image having a gradual shading region is projected onto the contrast enhancing screen in an environment where there is ambient light present. For example, the contrast enhancing screen may cause a sharp contrast or gray scale discontinuity at the border between pixel locations in a black state and pixel locations displaying the gradually shading pixels. In one exemplary embodiment, as will be explained below, the light engine may be configured to eliminate or reduce the visual effects of the gray scale discontinuity by using spatial and/or temporal dithering of the pixels within the gradual shading region. Spatial and temporal dithering will be explained below.

The light engine may be configured to use the measured ambient light intensity to estimate an "ambient light level" or, more particularly, the energy or dosage of ambient light received by a cluster or group of pixel locations on the viewing surface during a particular frame period. In one exemplary embodiment, the light engine is configured to alter the amount of spatial and temporal dithering used to generate gray scale levels in response to the estimated ambient light level.

More particularly, the light engine may be configured to compare the ambient light energy dosage or average ambient light intensity that a group or cluster of pixel locations receives during a frame period to the light engine energy dosage or average light intensity that the group of pixel locations receives from the light engine during the same frame period. In particular if the average ambient light intensity is approximately equal to or greater than the light engine average light intensity, the image processing unit may use spatial and/or temporal dithering to generate apparent gray scale levels for the pixels to be displayed in the group of pixel locations. In this manner, the actual dosage of light received by a given pixel location on the screen may be dominated by the influence of the light engine.

In the following description, for purposes of explanation, numerous specific details are set forth in order to provide a thorough understanding of the present method and system. It will be apparent, however, to one skilled in the art that the present method and system may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

The term "light engine" will be used herein and in the appended claims to refer to a front projector or any other display system configured to display an image on a screen with a contrast ratio that may be affected by ambient light. The image may be displayed on a contrast enhancing screen or any suitable viewing surface. The term "image" will be used herein and in the appended claims, unless otherwise specifically denoted, to refer broadly to a still image, series of images, motion picture video, or anything else that is displayed by a light engine.

FIG. 1 illustrates an exemplary light engine (100) according to an exemplary embodiment. The components of FIG. 1 are exemplary only and may be modified, changed, or added to as best serves a particular application. As shown in FIG. 1, image data is input into an image processing unit (106). The image data defines an image that is to be displayed by the light engine (100). While one image is illustrated and described as being processed by the image processing unit (106), it will be understood by one skilled in the art that a plurality or series of images may be processed by the image processing unit (106). The image processing unit (106) performs various functions including controlling the illumination of a light source (101) and controlling a spatial light modulator (SLM) (103).

As shown in FIG. 1, the light source (101) may provide a beam of light to a color device (102). The light source (101) may be, but is not limited to, a high pressure mercury lamp. The color device (102) is optional and enables the light engine (100) to display a color image. The color device (102) may be, but is not limited to, a sequential color device or a color wheel, for example.

Alternatively, the color device (102) may be a "parallel" color device such as an arrangement of dichroic mirrors that split the light into primary colored light, such as red, green, and blue light.

Light transmitted by the color device (102) may be focused onto the SLM (103) through a lens or through some other device (not shown). An SLM is a device that modulates incident light in a spatial pattern corresponding to an electrical or optical input. The terms "SLM" and "modulator" will be used interchangeably herein to refer to a spatial light modulator. The incident light may be modulated in its phase, intensity, polarization, direction, wavelength, color, hue, or any other property inherent to light by the modulator (103). Thus, the SLM (103) of FIG. 1 modulates the light output by the color device (102) based on input from the image processing unit (106) to form an image bearing beam of light that is eventually displayed or cast by display optics (104) onto a contrast enhancing screen (105) or other suitable viewing surface. The display optics (104) may comprise any device configured to display or project an image. For example, the display optics (104) may be, but are not limited to, a lens configured to project and focus an image onto a viewing surface. The screen (105) will be described in more detail below.

If the color device (102) is a parallel color device, then the SLM (103) may comprise a number of modulators (103) corresponding to each primary color. For example, if the color device (102) outputs red, green, and blue, the light engine (100) may include three modulators (103).

As shown in FIG. 1, an ambient light sensor (107) may be coupled to screen (105). The ambient light sensor (107) may be physically mounted on or connected to the screen (105), to a component of the light engine (100), or to something else in the room containing the screen (105). Moreover, there may be more than one (not shown) ambient light sensors (107) connected to the screen (105) or light engine (100). Ambient light sensors (107) are known in the art and will not be explained in detail. The ambient light sensor (107) is configured to provide information to the image processing unit (106) that is indicative of the intensity of one or more components of the ambient light or the luminance of the ambient light that surrounds or is adjacent to the screen (105) and/or the light engine (100). The image processing unit uses this information to estimate a dosage or energy of ambient light radiation that impinges on the screen (105). The purpose of the ambient light sensor (107) will be further explained below.

The SLM (103) may be, but is not limited to, a liquid crystal on silicon (LCOS) array, a micromirror array, a diffractive light device (DLD), or an analog LCD panel. LCOS and micromirror arrays are known in the art and will not be explained in detail in the present specification. An exemplary, but not exclusive, LCOS array is the Philips™ LCOS modulator. An exemplary, but not exclusive, micromirror array is the Digital Light Processing (DLP) chip available from Texas Instruments™ Inc.

As mentioned, the SLM (103) may also be a diffractive light device (DLD), in one exemplary embodiment. A DLD has an array of SLM pixel elements or cells that are each independently controllable to receive white light and output light having a spectral distribution that is peaked about a particular wavelength such as red, green, blue, cyan, magenta, yellow, violet, orange, or other colors. When we say that a SLM pixel element outputs a certain color, we mean that it is outputting a spectral distribution that is peaked about that color.

Each cell in a DLD includes an optical cavity with a dimension normal to the array of cells that is responsive to the application of a voltage across opposing plates that help to define the cavity. The cavity may be defined by controlling voltage across the opposing plates or controlling charge injection to one or both of the opposing plates. The dimension of that optical cavity determines the output spectral peak as discussed above. Further, the cavity has a black state at a certain dimension wherein nearly all of the light is absorbed.

In one alternative embodiment, the SLM (103) may be an analog LCD panel that is configured to pass continuously varying or analog amounts of polarized light depending on a voltage applied to each SLM pixel element. An LCD panel can operate in either a pulse width modulation mode or in an analog mode.

Figure 2:
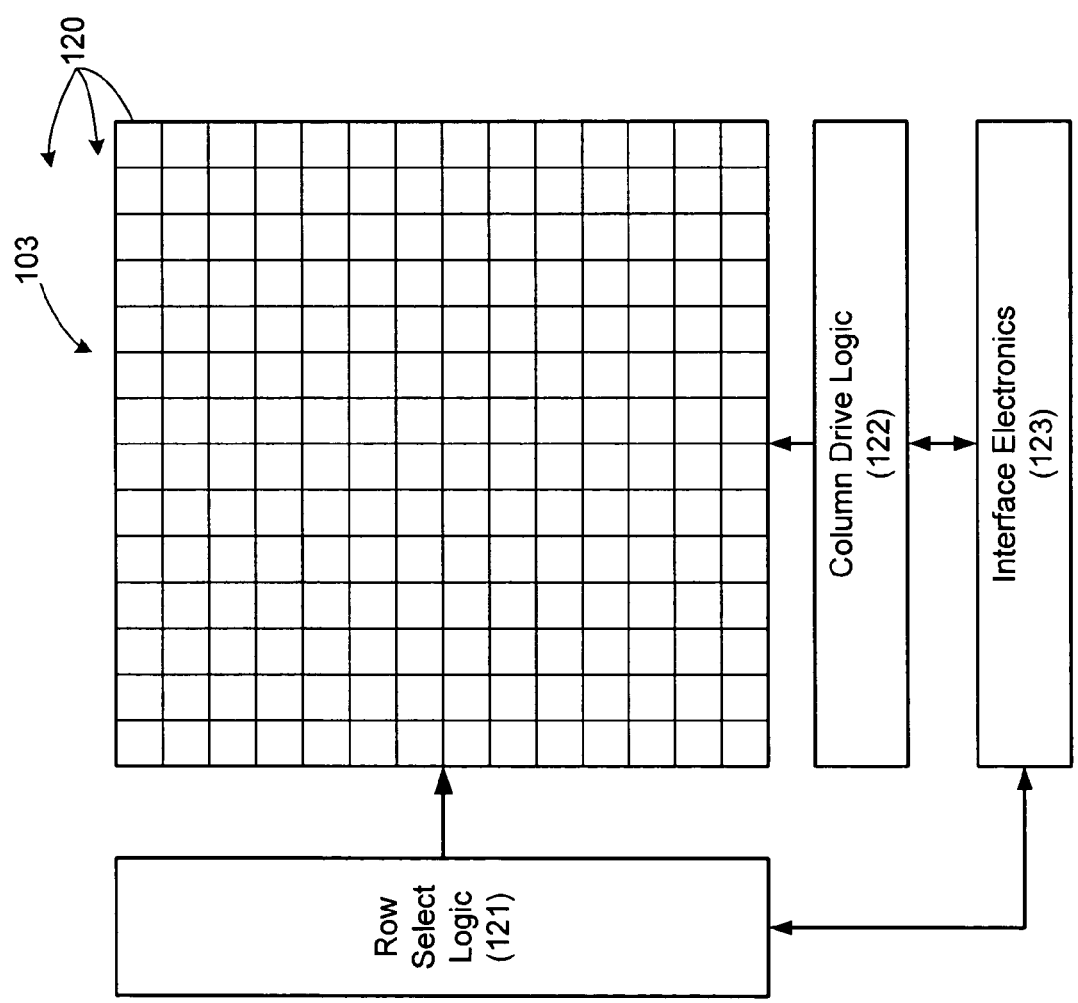
FIG. 2 illustrates an exemplary spatial light modulator that may be used in the light engine according to one exemplary embodiment.

FIG. 2 illustrates an exemplary SLM (103) that may be used in the above-described light engine (100; FIG. 1) according to one exemplary embodiment. The exemplary SLM (103) of FIG. 2 comprises an array of micromirrors (120), or SLM pixel elements, for illustrative purposes. The array of micromirrors (120) comprises a number of rows of micromirrors (120). The micromirrors (120) may be operated in a digital, or bistable, manner. Digital operation fully deflects a given micromirror to either a first position or a second position. The first position is the "on" position and the second position is the "off" position. Light generated by the light source (101; FIG. 1) illuminates the entire array of micromirrors. Micromirrors deflected to the first position reflect light along a first path, whereas micromirrors deflected to a second position reflect light along a second path. The display optics (104) of the light engine collects the light from the mirrors in the first or "on" position and focuses the light onto an image plane such as the screen (105; FIG. 1). The light reflected by micromirrors in the second or "off" position is prevented from reaching the image plane. In one exemplary embodiment, as will be explained in detail below, each micromirror or SLM pixel element may correspond to a pixel location on the screen (105; FIG. 1) upon which the image is displayed. A pixel location on the screen (105; FIG. 1) associated with an SLM pixel element in the "on" position is illuminated, whereas a pixel location on the screen (105; FIG. 1) associated with an SLM pixel element in the "off" position is not illuminated or is in a "black" state.

FIG. 2 illustrates control circuitry (121-123) that controls the operation of the micromirrors (120). For example, row select logic (121) and column drive logic (122) may send update data to particular micromirrors in the array of micromirrors (120) to indicate whether the micromirrors are to be in the "on" or "off" position at a given time. Interface electronics (123) may be included in the light engine (100; FIG. 1) to interface between the other components of the light engine (100; FIG. 1) and the logic (121, 122) controlling the SLM (103). The control circuitry (121-123) is optional and may or may not be included in the light engine (100; FIG. 1).

The SLM (103) may be configured to produce an image with varying levels of intensity, or gray scale levels. The term "gray scale level" may refer to the intensity of individual primary colors, such as red, green, and blue, or it can refer to the total intensity or luminance of light reflected off a particular screen pixel location. In one embodiment, the SLM (103) may use half-toning to generate a given intensity or gray scale level for the pixels that are displayed on the contrast enhancing screen (105). Half-toning may be accomplished by pulse width modulation or spatial modulation, for example. In other words, a SLM pixel element may be rapidly turned on and off within a given frame period to generate a desired gray scale level for a pixel that is displayed in the SLM pixel element's corresponding pixel location on the screen (105; FIG. 1). If an SLM pixel element is pulsed quickly enough within a given frame, the human eye will accurately measure the gray scale level of the pixel during that frame, but will fail to detect the pulsing. Half-toning may also be accomplished by other methods such as varying the intensity of light delivered to the pixels' corresponding pixel locations throughout a frame period. In yet another exemplary embodiment, half-toning may be accomplished by a combination of pulse width modulation and intensity variation.

Figure 3:
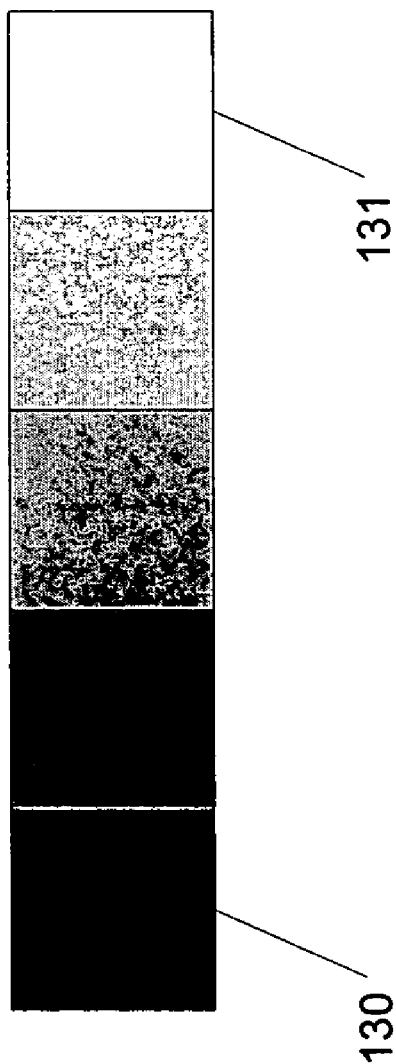
FIG. 3 illustrates a spectrum of exemplary gray scale levels according to one exemplary embodiment.

FIG. 3 illustrates a spectrum of exemplary gray scale levels according to an exemplary embodiment. The gray scale levels of FIG. 3 are illustrative and it will be recognized that there may be more or fewer levels of gray scale as best serves a particular light engine. As shown in FIG. 3, the first gray scale level (130) is completely black. A completely black gray scale level corresponds to a pixel that is in the "off" state during an entire frame (i.e. the pixel's corresponding SLM micromirror or element is in the "off" position). As shown in FIG. 3, the gray scale levels increase in brightness until the last gray scale level (131). The last gray scale level (131) is white and corresponds to a pixel that is in the "on" state during an entire frame (i.e. the pixel's corresponding SLM micromirror or element is in the "on" position during the entire frame). The gray scale levels in between the first and last gray scale levels (130, 131) may be generated by varying the amount of time within a given frame that the pixel is "on."

In an alternative embodiment, if the SLM (103) is an analog device such as an LCD panel, the SLM (103) may have an "on" state, an "off" state, and analog levels between the "on" and "off" states. An analog SLM (103) may add gray scale levels to an image by varying the analog level between the "on" and "off" states.

Figure 4:
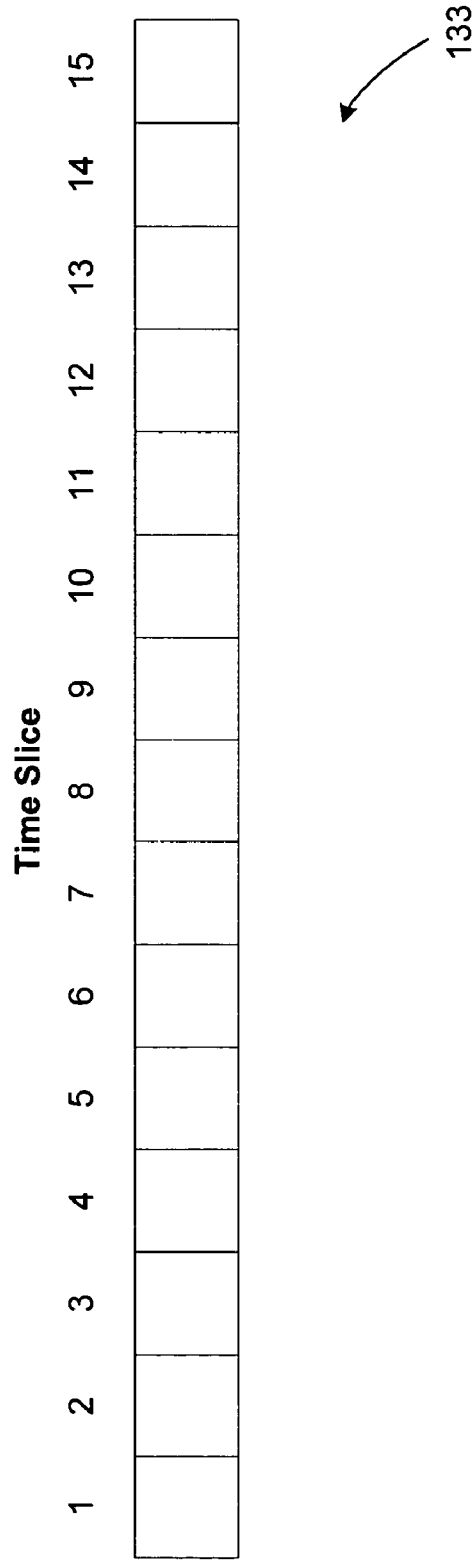
FIG. 4 illustrates an exemplary video frame that has been divided into a number of time slices according to one exemplary embodiment.

FIG. 4 illustrates an exemplary video frame (133) that has been divided into a number of time slices. As will be explained below, the division of a video frame (133) into a number of time slices allows a light engine (100; FIG. 1) to generate a color image with varying intensities or gray scale levels. Although the exemplary frame (133) of FIG. 4 is divided into fifteen time slices, the frame (133) may be divided into any number of time slices as best serves a particular application.

According to an exemplary embodiment, in a frame that has been divided into $2^m-1$ time slices, the SLM (103; FIG. 1) may generate up to $2^m$ possible levels of gray scale for each of the pixels associated with the SLM (103; FIG. 1). In other words, the SLM (103; FIG. 1) may generate up to $2^m$ different intensities or shades of a particular color for each of the pixels. In terms of bits, in a frame that has been divided into $2^m-1$ time slices, the SLM (103; FIG. 1) may generate up to m bits of color for each of the pixels. The variable "m," as used herein and in the appended claims, may be any integer that is equal to or greater than one.

The number of bits of gray scale resolution may vary as best serves a particular application. For example, some light engines may be configured to generate 24-bit color, or eight bits of gray scale for each of three primary colors. Other light engines may be configured to generate more or less than three primary colors, each having more or less than eight bits of gray scale. Thus, an exemplary value for m may be 24. However, as previously explained, the value of m may vary as best serves a particular application.

Figure 5:
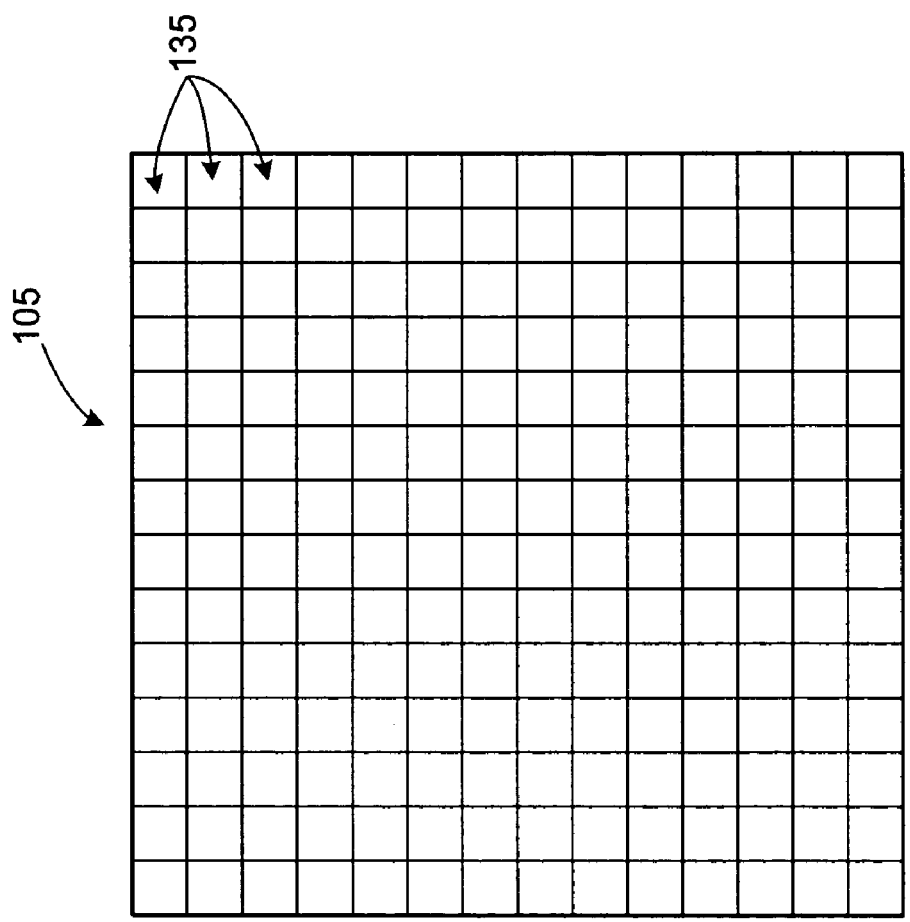
FIG. 5 illustrates an exemplary contrast enhancing screen that may be used in conjunction with the light engine according to one exemplary embodiment.

FIG. 5 illustrates an exemplary screen (105) that may be used in conjunction with the light engine (100; FIG. 1) of FIG. 1. According to an exemplary embodiment, the screen (105) is a contrast enhancing screen configured to reflect light projected onto it by the light engine (100; FIG. 1) and thereby display an image. As shown in FIG. 5, the contrast enhancing screen (105) comprises a number of screen pixel elements (135). Each screen pixel element (135) has a corresponding screen pixel location on the surface of the screen (105). The number of screen pixel elements (135) may vary depending on the physical dimensions of the screen (105). Furthermore, as mentioned previously, the screen pixel elements (135) may correspond to the SLM pixel elements (120; FIG. 2) of the SLM (103; FIG. 2) to some extent, but they may not be perfectly aligned or cover exactly the same screen pixel locations on the screen (105).

As its name suggests, the contrast enhancing screen (105) is configured to enhance the contrast of an image that is displayed on the screen (105). In one exemplary embodiment, the contrast enhancing screen (105) is configured to turn screen pixel elements (135) corresponding to screen pixel locations that do not have light projected onto them by the light engine (100; FIG. 1) to a non-reflective state or "black state." The contrast enhancing screen (105) is further configured to turn screen pixel elements (135) corresponding to screen pixel locations that have light projected onto them by the light engine (100; FIG. 1) to a reflective state. By turning screen pixel elements (135) that do not have light projected onto them by the light engine (100; FIG. 1) to a non-reflective state and screen pixel elements (135) that have light projected onto them by the light engine (100; FIG. 1) to a reflective state, the screen (105) diminishes the contrast-reducing effect of ambient light that may be in the vicinity of the screen (105) and therefore enhances the contrast of the image that is displayed on the screen (105).

Figure 6:
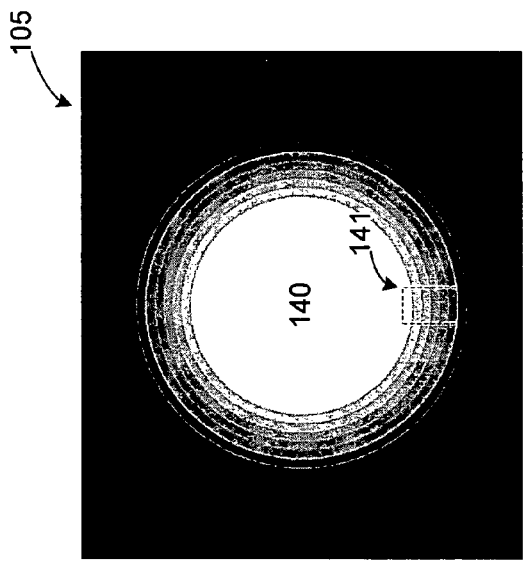
FIG. 6 illustrates an exemplary image with a gradual shading region that is displayed on the contrast enhancing screen according to one exemplary embodiment.

The contrast enhancing screen (105) of FIG. 5 is well-suited for displaying images with sharp color transitions, such as black text on a white background for example. However, in many instances, the light engine (105) projects an image with a gradual shading region onto the contrast enhancing screen (105). FIG. 6 illustrates an exemplary image (140) with a gradual shading region (141) that is displayed on the contrast enhancing screen (105).

The gradual shading region (141) shown in FIG. 6 transitions between black pixel locations and white pixel locations for illustrative purposes only. In one exemplary embodiment, the gradual shading region (141) may transition between screen pixel locations having any two colors.

Figure 8:
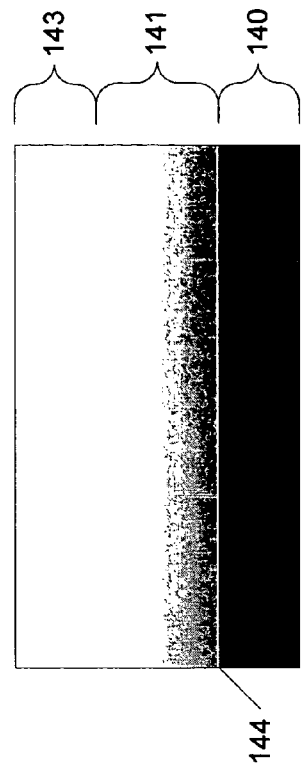
FIG. 8 illustrates that the presence of ambient light may create a sharp discontinuity in the color transition between the pixels that are in a black state and pixels that are in the gradual shading region of the exemplary image according to one exemplary embodiment.
Figure 7:
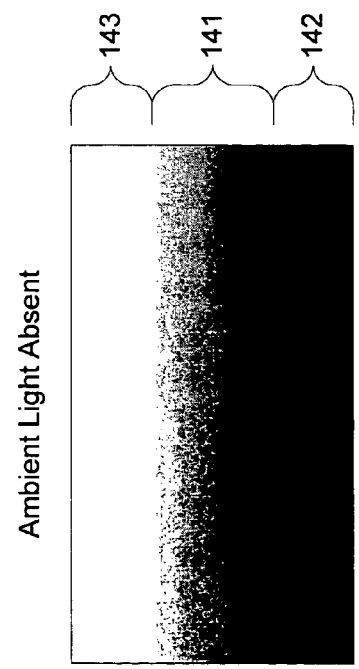
FIG. 7 illustrates that absent the presence of ambient light, the color of the exemplary image gradually shades from black to white according to one exemplary embodiment.

FIGS. 7 and 8 illustrate the effect of ambient light on the gradual shading region (141) of FIG. 6. First, FIG. 7 illustrates that absent the presence of ambient light, the color of the image (140) gradually shades (141) from black (142) to white (143). The black region (142) comprises screen pixel locations that have been turned to a non-reflective state because they do not have any light projected onto them by the light engine (100; FIG. 1). On the other hand, the screen pixel locations in the gradual shading region (141) and in the white region (143) are in a reflective state because they have light projected onto them by the light engine (100; FIG. 1).

However, as shown in FIG. 8, the presence of ambient light may create a sharp discontinuity (144) in the gray scale transition between the screen pixel locations that are in a black state (140) and screen pixel locations that are in the gradual shading region (141). The sharp discontinuity (144) is due to the fact that screen pixel locations in a reflective state reflect any ambient light present as well as the light projected by the light engine (100; FIG. 1). Accordingly, the screen pixel locations in the gradual shading region (141) reflect not only the light shown on them by the light engine (100; FIG. 1), but also the ambient light present in the vicinity of the screen (105). If the amount of ambient light is appreciable, a sharp discontinuity (144) may be visible at the edge of the black region (140) and the gradual shading region (141) because of the added intensity of the pixels displayed in the gradual shading region (141) due to the ambient light.

FIG. 9 is a flow chart illustrating a method of eliminating or reducing the visual effects of the sharp discontinuity (144; FIG. 8) at the edge of the black region (140; FIG. 8) and the gradual shading region (141; FIG. 8) caused by ambient light. The method comprises using a spatial and/or temporal dithering pattern to generate gray scale levels for some or all of the pixels to be displayed in the gradual shading region (141; FIG. 8). The dithering method allows the gradual shading to be generated by an arrangement, sequence, and/or "checkerboard" pattern of "on" and "off" pixels. The dithering pattern may change from frame to frame based on the intensity of ambient light and projected light incident upon the screen pixel locations on the screen (105; FIG. 5).

As shown in FIG. 9, the method comprises first measuring the ambient light intensity (step 193) present within a given frame with the ambient light sensor (107; FIG. 1). The ambient light sensor (107; FIG. 1) communicates the ambient light intensity measurement to the image processing unit (106; FIG. 1) which compares the ambient light intensity to the intensity of the light (i.e. gray scale level) in the gradual shading region (141; FIG. 6) that is projected by the light engine (100; FIG. 1) during the frame (step 194). In an alternative embodiment, the comparison (step 194) may be performed by a component of the light engine (100; FIG. 1) other than the image processing unit (106; FIG. 1) or by a processor unit that is not a part of the light engine (100; FIG. 1). In yet another alternative embodiment, the comparison step (step 194) is not performed and the dithering algorithm is based solely on the measurement of the ambient light intensity (step 193).

To perform the comparison (step 194), the image processing unit (106; FIG. 1) may integrate the measured ambient light intensity over the frame period and convert the resulting ambient light energy density may to a binary value. The binary value may then be compared to a binary value representing the number of bits of gray scale level or intensity of the projected light (i.e. the light projected by the light engine (100; FIG. 1)) in the gradual shading region (141; FIG. 6). A binary value comparison of ambient light energy density to the gray scale level of the projected light is not necessarily the only way to perform the comparison (step 194). Other methods for perform the comparison (step 194) may be used as best serves a particular application.

After performing the comparison (step 194), the image processing unit (106; FIG. 1) selects a dithering algorithm based on the comparison (step 195). For example, in one exemplary embodiment, the image processing unit (106; FIG. 1) may select the appropriate dithering algorithm based on the difference between the ambient light intensity and the intensity of the light projected by the light engine (100; FIG. 1). The selection may be made from a look-up table, for example. In an alternative embodiment, the image processing unit (106; FIG. 1) may select the appropriate dithering algorithm based on the total amount of combined ambient light intensity and the intensity of the light projected by the light engine (100; FIG. 1) in the gradual shading region (141; FIG. 6).

The particular dithering algorithm that is selected by the image processing unit (106; FIG. 1) may vary as best serves a particular application. Moreover, in an exemplary embodiment, a number of different dithering algorithms may be selected and used within the same gradual shading region (141; FIG. 6).

Furthermore, the number of pixels that are dithered in the gradual shading region (141; FIG. 6) may vary as best serves a particular application. For example, in some instances, only the pixels in the gradual shading region (141; FIG. 6) with a projected light intensity equal to or less than the ambient light intensity are dithered. In other instances, all of the pixels to be displayed in the gradual shading region (141; FIG. 6) are dithered. Yet in other instances, only pixels with the two or three least significant bits of gray scale shading are dithered. An example of the many possible dithering algorithms will be described below.

Once the dithering algorithm has been selected, the dithering algorithm is used to generate apparent gray scale levels for some or all of the pixels to be displayed in the gradual shading region (141; FIG. 6) (step 196). By generating apparent gray scale levels for some or all of the pixels in the gradual shading region (141; FIG. 6), the sharp discontinuity (144; FIG. 8) caused by ambient light may be eliminated or its visual effects may be reduced. The term "apparent gray scale level" will be described below.

An example of the dithering method described in connection with FIG. 9 will now be given. Consider a light engine (100; FIG. 1) configured to generate eight bits of gray scale for each pixel in an image that is to be displayed on a contrast enhancing screen (105; FIG. 1). The image in the present example comprises a gradual shading region (141; FIG. 6). The ambient light intensity is measured by the ambient light sensor (107; FIG. 1) and is converted to a binary value corresponding to one of the eight bits of gray scale. In this example, the ambient light energy level is equal to 2 bits for illustrative purposes only.

The image processing unit (106; FIG. 1) then compares the ambient light energy level to the intensity of the light in the gradual shading region (141; FIG. 6) that is projected by the light engine (100; FIG. 1). Based on this comparison, the image processing unit (106; FIG. 1) selects an appropriate dithering algorithm for some or all of the pixels to be displayed in the gradual shading region (141; FIG. 6). FIG. 10 illustrates an exemplary look-up table that may be used by the image processing unit (106; FIG. 1) to select the appropriate dithering algorithm. As shown in FIG. 10, the image processing unit (106; FIG. 1) may select one of a number of different dithering algorithms based on the ambient light intensity measured in bits and the projected light intensity measured in bits. For example, if the projected light intensity is equal to 1 bit and the ambient light intensity is equal to 2 bits, then the dithering algorithm "G" may be selected.

The exemplary look-up table of FIG. 10 is simplified for illustrative purposes. It will be recognized that the look-up table may have more or less entries than are illustrated in FIG. 10. Furthermore, the particular dithering algorithm may be selected based on different criteria than are illustrated in FIG. 10.

Figure 11:
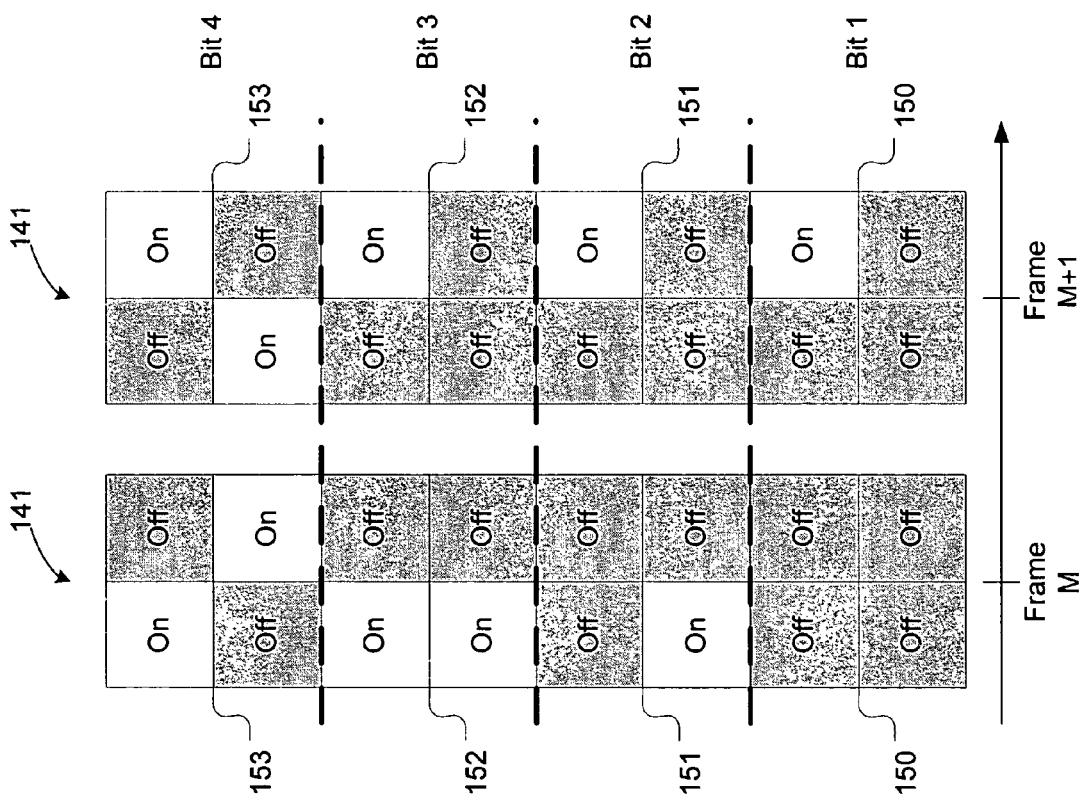
FIG. 11 illustrates an exemplary dithering algorithm that may be used in connection with the method described in FIG. 9 according to one exemplary embodiment.

FIG. 11 illustrates an exemplary dithering algorithm that may be used in connection with the method described in FIG. 9. The exemplary dithering algorithm shown in FIG. 11 temporally and spatially dithers pixels to be displayed in the gradual shading region (141) such that the pixels appear to have gray scale levels that gradually shade from 1 bit to 4 bits. As shown in FIG. 11, the pixels are divided into in four pixel blocks each including four pixels. In particular, there is a first pixel block (150), a second pixel block (151), a third pixel block (152), and a fourth pixel block (153). Each pixel block (150-153) has a corresponding pixel block location on the screen (105; FIG. 1). After being temporally and spatially dithered, the first pixel block (150) is to have an apparent gray scale level of 1 bit, the second pixel block (151) is to have an apparent gray scale level of 2 bits, the third pixel block (152) is to have an apparent gray scale level of 3 bits, and the fourth pixel block (153) is to have an apparent gray scale level of 4 bits.

As used herein and in the appended claims, unless otherwise specifically denoted, the term "apparent gray scale level" will be used to refer to an average intensity of all the pixels within a pixel block (e.g.; 150-153). The average intensity of the pixels may be calculated across a number of frames, depending on the dithering algorithm. In general, if X represents the number of pixels in a pixel block, N represents the number of sequential frames used by the dithering algorithm, and Y represents the total number of pixels in the "on" state during the N frames, then the average intensity of the pixels is equal to Y/(N*X). For example, if a particular dithering algorithm uses two sequential frames to accomplish the dithering of a group of four pixels and two pixels are in the "on" state during the two frames, then the average intensity of the pixels is equal to 2/(2*4) which is 2/8. This average intensity is equal to an apparent gray scale level of 2 bits in an 8-bit gray scale light engine according to an exemplary embodiment.

As shown in FIG. 11, the dithering algorithm temporally and spatially dithers the pixels in each of the groups of pixels by activating, or turning "on" select pixels during one of two frames (frame M and frame M+1). As will be used herein and in the appended claims, a pixel in the "on" state is activated during a given time period and a pixel (135) in the "off" state is not activated during the given time period in the case of digital devices. Furthermore, the terms "turning 'on'" and "activating" a pixel herein and in the appended claims will be used interchangeably to refer to causing the pixel to be in the "on" state. A pixel may be turned "on" or activated by controlling the pixel's corresponding pixel element (120; FIG. 2) within the SLM (103; FIG. 2).

As shown in FIG. 11, the first pixel block (150) is given an apparent gray scale level of 1 bit by activating only one pixel within the first pixel block (150) during either frame M or frame M+1. Although FIG. 11 depicts the top-right pixel being in the "on" state during frame M+1 and the rest of the pixels in the first pixel block (150) being in the "off" state during both frame M and frame M+1, it will be understood that any one of the four pixels in the first pixel block (150) may be activated during one of the two frames to achieve an apparent gray scale level of 1 bit for the first pixel block (150).

Likewise, the second pixel block (151) is given an apparent gray scale level of 2 bits by activating two pixels within the second pixel block (150) during either frame M or frame M+1. As shown in FIG. 11, the bottom-left pixel is the only pixel in the second pixel block (151) that in the "on" state during frame M and the top-right pixel is the only pixel in the second pixel block (151) that in the "on" state during frame M+1. In one exemplary embodiment, any two of the pixels in the second pixel block (151) may be activated during the two frames to achieve an apparent gray scale level of 2 bits for the second pixel block (151).

FIG. 11 shows that the third and fourth groups of pixels (152, 153) are given apparent gray scale levels of 3 and 4 bits, respectively, using the same process described in connection with the generation of the apparent gray scale levels for the first and second groups of pixels (150, 151).

The exemplary dithering algorithm described in connection with FIG. 11 is one example of the many types of dithering algorithms that may be used to eliminate or reduce the visual effects of the sharp discontinuity (144; FIG. 8) caused by ambient light. Other dithering algorithms may be used as best serves a particular application. In one exemplary embodiment, the dithering algorithm may use any number of frames, use any number of groups of pixels, and generate any number of apparent gray scale levels. Furthermore, there may be any number of pixels within each of the groups of pixels.

Figure 12:
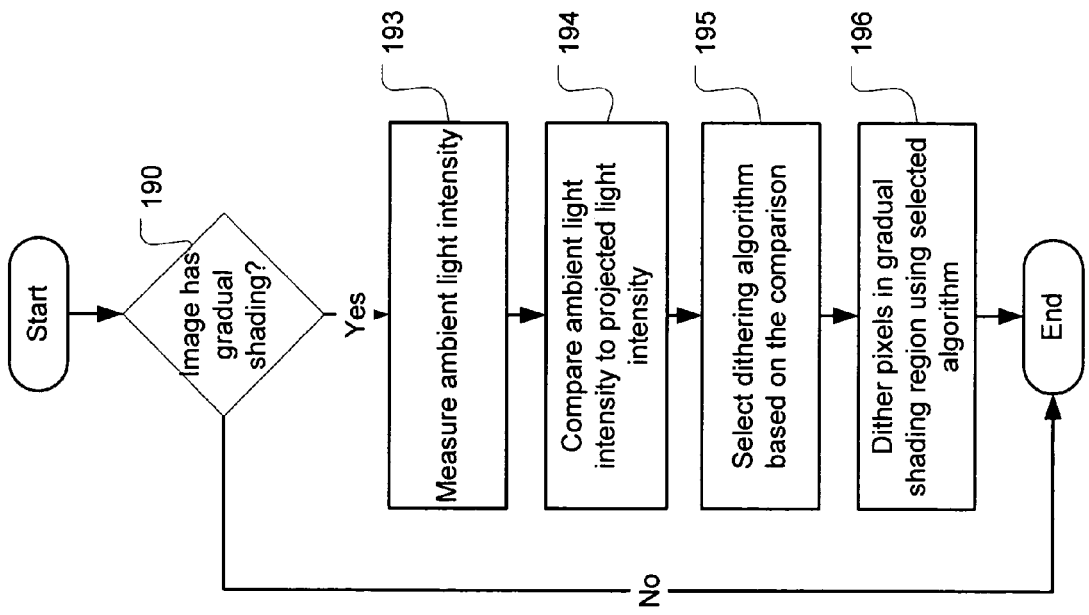
FIG. 12 is a flow chart illustrating that the method of eliminating or reducing the visual effects of the sharp discontinuity described in connection with FIG. 9 may be used only if the image that is to be displayed includes gradual shading at the image's borders according to one exemplary embodiment.

FIG. 12 is a flow chart illustrating that the method of eliminating or reducing the visual effects of the sharp discontinuity (144; FIG. 8) described in connection with FIG. 9 may be used only if the image that is to be displayed includes gradual shading at the image's borders. As shown in FIG. 12, the image processing unit (106; FIG. 1) or some other component of the light engine (100; FIG. 1) first determines whether the image that is to be displayed includes edges with gradual shading (step 190). If the image does include edges with gradual shading (Yes; step 190), then the dithering method described in connection with FIG. 9 is used to eliminate or reduce the visual effects of the sharp discontinuity (144; FIG. 8) caused by the ambient light. However, if the image does not include edges with gradual shading (No, step 190), the dithering method described in connection with FIG. 9 is not applied to any of the pixels of the image. White text on a black background is an exemplary image that does not include edges with gradual shading.

In yet another embodiment, the light engine (100; FIG. 1) may further comprise a user-controllable device, knob, button, or other function configured to control the use of the dithering by the light engine (100; FIG. 1). For example, a user of the light engine (100; FIG. 1) may desire that the light engine (100; FIG. 1) not use any dithering even if there is a significant amount of ambient light present in the room. The user may then set the device, knob, button, or other function such that the light engine (100; FIG. 1) does not use any dithering.

The preceding description has been presented only to illustrate and describe embodiments of invention. It is not intended to be exhaustive or to limit the invention to any precise form disclosed. Many modifications and variations are possible in light of the above teaching. It is intended that the scope of the invention be defined by the following claims.

What is claimed is:

1. A method of reducing a gray scale discontinuity between pixel locations in a blackened state on a contrast enhancing screen and pixel locations in a gradual shading region of an image displayed by a projector on said contrast enhancing screen, said discontinuity caused by ambient light, said method comprising:
   measuring an intensity of said ambient light;
   comparing said measured ambient light intensity to an average intensity of light projected by said projector onto said gradual shading region; and
   generating apparent gray scale levels for pixels to be displayed in said pixel locations in said gradual shading region based on said comparison.

2. The method of claim 1, further comprising:
   selecting a dithering algorithm based on said comparison;
   wherein said step of generating said apparent gray scale levels uses said dithering algorithm to generate said apparent gray scale levels for said pixels to be displayed in said pixel locations in said gradual shading region.

3. The method of claim 1, wherein said step of generating said apparent gray scale levels for said pixels to be displayed in said pixel locations in said gradual shading region comprises:
   spatially and temporally dithering pixel blocks during a number of frame periods, each of said pixel blocks comprising a plurality of said pixels to be displayed in said pixel locations in said gradual shading region;
   wherein said spatial and temporal dithering of said pixel blocks generates an apparent gray scale level for each of said pixel blocks.

4. The method of claim 3, wherein, during each of said number of frame periods, said step of spatially and temporally dithering said pixels comprises activating one or more of said plurality of pixel locations in each of said pixel blocks.

5. The method of claim 3, wherein said pixel blocks each comprise four pixels.

6. The method of claim 3, wherein said number of frame periods is equal to two.

7. A method of operating a light engine configured to project light onto a group of pixel locations of a viewing surface during a time period, said method comprising:
   estimating an ambient light energy received by said group of pixel locations during said time period;
   determining a threshold gray scale level of the light engine; and
   dithering pixels having gray scale levels at or below said threshold gray scale level to be displayed in said group of pixel locations if said estimated ambient light energy is greater than or substantially equal to said threshold gray scale level.

8. The method of claim 7, further comprising measuring an ambient light intensity, wherein said step of estimating said ambient light energy is based on said measured ambient light intensity.

9. The method of claim 7 wherein said time period is one or more frame periods.

10. The method of claim 7, wherein said time period is a portion of a frame period.

11. The method of claim 7, wherein said step of dithering said pixels comprises spatially and temporally dithering pixel blocks during said time period, each of said pixel blocks comprising a plurality of said pixels to be displayed in said group of pixel locations.

12. A method of operating a light engine configured to generate and display an image on a viewing surface, said image formed by pixels having varying gray scale levels, said method comprising:
   generating an estimate of an ambient light intensity level; and
   selecting between half-toning and dithering to generate said gray scale levels for each of said pixels in response to said estimated ambient light level.

13. The method of claim 12, wherein said step of generating said estimate of said ambient light intensity level comprises measuring said ambient light intensity level with an ambient light sensor and transferring said measured ambient light intensity level to said light engine.

14. The method of claim 12, further comprising selecting a threshold gray scale level, wherein said dithering is selected to generate said gray scale levels for each of said pixels that is to have a gray scale level at or below said threshold gray scale level if said estimated ambient light energy is greater than or substantially equal to said threshold gray scale level.

15. The method of claim 14, wherein said half-toning is selected to generate said gray scale levels for each of said pixels if said estimated ambient light energy is less than said threshold gray scale level.

16. The method of claim 14, wherein said dithering comprises spatially and temporally dithering pixel blocks during a number of frame periods, each of said pixel blocks comprising a plurality of said pixels.

17. A system for reducing a gray scale discontinuity between pixel locations in a blackened state on a contrast enhancing screen and pixel locations in a gradual shading region of an image displayed by a projector on said contrast enhancing screen, said discontinuity caused by ambient light, said system comprising:

an ambient light sensor configured to measure an intensity of said ambient light;

an image processing unit configured to compare said measured ambient light intensity to an average intensity of light projected by said projector onto said gradual shading region; and a spatial light modulator configured to generate apparent gray scale levels for pixels to be displayed in said pixel locations in said gradual shading region based on said comparison.

18. The system of claim 17, wherein said image processing unit is further configured to select a dithering algorithm based on said comparison and said spatial light modulator is further configured to use said dithering algorithm to generate said apparent gray scale levels for said pixels to be displayed in said pixel locations in said gradual shading region.

19. The system of claim 17, wherein said spatial light modulator is configured to generate apparent gray scale levels for said pixels to be displayed in said pixel locations in said gradual shading region by spatially and temporally dithering pixel blocks during a number of frame periods, each of said pixel blocks comprising a plurality of said pixels to be displayed in said pixel locations.

20. The system of claim 19, wherein said pixel blocks each comprise four pixels.

21. The system of claim 19, wherein said number of frame periods is equal to two.

22. The system of claim 17, wherein said spatial light modulator is selected from the group consisting of an analog based light modulator, a pulse-width modulation based light modulator, a liquid crystal display (LCD) panel, a liquid crystal on silicon (LCOS) device, a diffractive light device (DLD), and an array of micromirrors.

23. A light engine for displaying an image having a gradual shading region on a contrast enhancing screen, said light engine comprising:

a spatial light modulator configured to generate gray scale levels for pixels in said image;

projector optics configured to project light comprising said image onto said contrast enhancing screen, said projected light having an intensity; and an ambient light sensor configured to measure an intensity of ambient light reflecting off pixel locations in said contrast enhancing screen corresponding to said gradual shading region;

wherein said spatial light modulator reduces a gray scale discontinuity caused by said ambient light between pixel locations in a blackened state on said contrast enhancing screen and said pixel locations in said gradual shading region by generating apparent gray scale levels for said pixels to be displayed in said pixel locations in said gradual shading region based on a comparison between said measured ambient light intensity and said projected light intensity.

24. The system of claim 23, wherein said light engine further comprises:

an image processing unit configured to select a dithering algorithm based on said comparison;

wherein said spatial light modulator is further configured to use said dithering algorithm to generate said gray scale levels for said pixels to be displayed in said pixel locations in said gradual shading region.

25. The system of claim 24, wherein said dithering algorithm comprises spatially and temporally dithering pixel blocks during a number of frame periods, each of said pixel blocks comprising a plurality of said pixels to be displayed in said pixel locations in said gradual shading region.

26. The system of claim 25, wherein said number of frame periods is equal to two.

27. The system of claim 24, wherein said spatial light modulator is selected from the group consisting of an analog based light modulator, a pulse-width modulation based light modulator, a liquid crystal display (LCD) panel, a liquid crystal on silicon (LCOS) device, a diffractive light device (DLD), and an array of micromirrors.

28. A projector system for displaying an image on a viewing surface, said system comprising:

a light engine configured to generate pixels having gray scale levels to be displayed in corresponding pixel locations on said viewing surface; and an ambient light sensor configured to measure an intensity of ambient light reflecting off said pixel locations on said viewing surface;

wherein said light engine is further configured to receive said measured ambient light intensity from said ambient light sensor and select between a half-toning algorithm and a dithering algorithm to generate said gray scale levels for each of said pixels based on said measured ambient light intensity.

29. The system of claim 28, wherein said dithering algorithm is selected to generate said gray scale levels for each of said pixels that is to have a gray scale level at or below a predetermined threshold gray scale level if said estimated ambient light energy is greater than or substantially equal to said threshold gray scale level.

30. The system of claim 29, wherein said half-toning algorithm is selected to generate said gray scale levels for each of said pixels if said estimated ambient light energy is less than said threshold gray scale level.

31. The system of claim 28, wherein said dithering algorithm comprises spatially and temporally dithering pixel blocks during a number of frame periods, each of said pixel blocks comprising a plurality of said pixels to be displayed in said pixel locations in said gradual shading region.

32. The system of claim 31, wherein said number of frame periods is equal to two.

33. The system of claim 28, wherein said light engine comprises a spatial light modulator configured to generate said gray scale levels of said pixels.

34. The system of claim 33, wherein said spatial light modulator is selected from the group consisting of an analog based light modulator, a pulse-width modulation based light modulator, a liquid crystal display (LCD) panel, a liquid crystal on silicon (LCOS) device, a diffractive light device (DLD), and an array of micromirrors.

35. The system of claim 28, wherein said viewing surface comprises a contrast enhancing screen.

36. A system for reducing a gray scale discontinuity between pixel locations in a blackened state on a contrast enhancing screen and pixel locations in a gradual shading region of an image displayed by a projector on said contrast enhancing screen, said discontinuity caused by ambient light, said system comprising:

means for measuring an intensity of said ambient light;

means for comparing said measured ambient light intensity to an average intensity of light projected by said projector onto said gradual shading region; and means for generating apparent gray scale levels for pixels to be displayed in said pixel locations in said gradual shading region based on said comparison.

37. The system of claim 36, further comprising:
  means for selecting a dithering algorithm based on said comparison;
  wherein said means for generating said apparent gray scale levels uses said dithering algorithm to generate said apparent gray scale levels for said pixels to be displayed in said pixel locations in said gradual shading region.

38. The system of claim 36, wherein said means for generating said apparent gray scale levels for said pixels to be displayed in said pixel locations in said gradual shading region comprises:
  means for spatially and temporally dithering pixel blocks during a number of frame periods, each of said pixel blocks comprising a plurality of said pixels to be displayed in said pixel locations in said gradual shading region;
  wherein said means for spatial and temporal dithering of said pixel blocks generates an apparent gray scale level for each of said pixel blocks.

39. The system of claim 38, wherein, during each of said number of frame periods, said means for spatially and temporally dithering said pixels comprises means for activating one or more of said plurality of pixel locations in each of said pixel blocks.

40. A system for operating a light engine configured to project light onto a group of pixel locations of a viewing surface during a time period, said system comprising:
  means for estimating an ambient light energy received by said group of pixel locations during said time period;
  means for determining a threshold gray scale level of said light engine; arid
  means for dithering pixels having gray scale levels at or below said threshold gray scale level to be displayed in said group of pixel locations if said estimated ambient light energy is greater than or substantially equal to said threshold gray scale level.

41. The system of claim 40, further comprising means for measuring an ambient light intensity, wherein said means for estimating said ambient light energy is based on said measured ambient light intensity.

42. A system for operating a light engine configured to generate and display an image on a viewing surface, said image formed by pixels having varying gray scale levels, said system comprising:
  means for generating an estimate of an ambient light intensity level; and
  means for selecting between a half-toning means and a dithering means to generate said gray scale levels for each of said pixels in response to said estimated ambient light level.

43. The system of claim 42, wherein said means for generating said estimate of said ambient light intensity level comprises means for measuring said ambient light intensity level.

44. The system of claim 42, further comprising means for selecting a threshold gray scale level, wherein said dithering means is selected to generate said gray scale levels for each of said pixels that is to have a gray scale level at or below said threshold gray scale level if said estimated ambient light energy is greater than or substantially equal to said threshold gray scale level.

45. The system of claim 44, wherein said half-toning means is selected to generate said gray scale levels for each of said pixels if said estimated ambient light energy is less than said threshold gray scale level.

46. The system of claim 44, wherein said dithering means comprises spatially and temporally dithering pixel blocks during a number of frame periods, each of said pixel blocks comprising a plurality of said pixels.

\* \* \* \* \*

UNITED STATES PATENT AND TRADEMARK OFFICE
CERTIFICATE OF CORRECTION

PATENT NO. : 7,605,828 B2 Page 1 of 1
APPLICATION NO. : 10/782706
DATED : October 20, 2009
INVENTOR(S) : Winthrop D. Childers It is certified that error appears in the above-identified patent and that said Letters Patent is hereby corrected as shown below:

In column 15, line 31, in Claim 40, delete "arid" and insert -- and --, therefor.

Signed and Sealed this

Nineteenth Day of January, 2010

David J. Kappos
*Director of the United States Patent and Trademark Office*